March 27, 1962     A. THOMAS     3,026,871
APPARATUS FOR OXYGENATING BLOOD
Filed Jan. 27, 1959     3 Sheets-Sheet 2
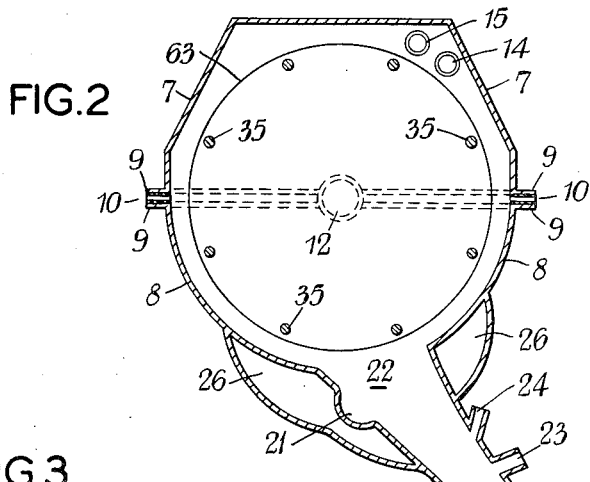
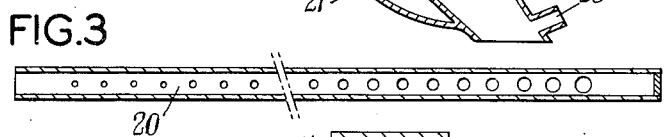
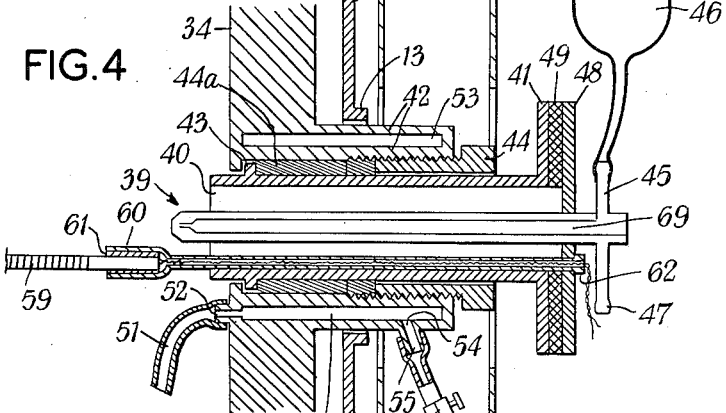
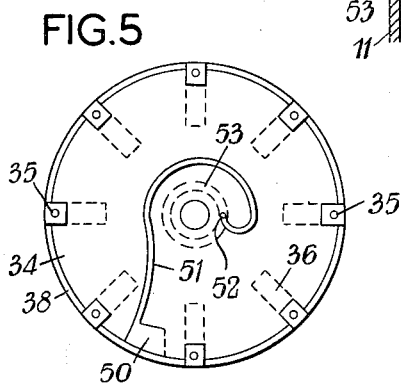
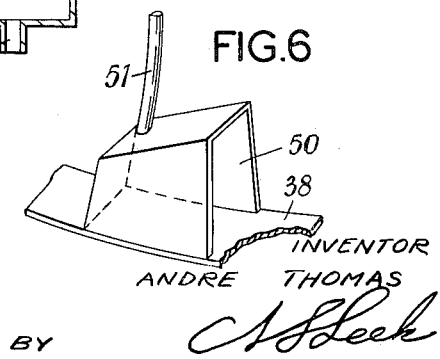
INVENTOR
ANDRE THOMAS
BY
ATTORNEY March 27, 1962 A. THOMAS 3,026,871
APPARATUS FOR OXYGENATING BLOOD
Filed Jan. 27, 1959 3 Sheets-Sheet 3
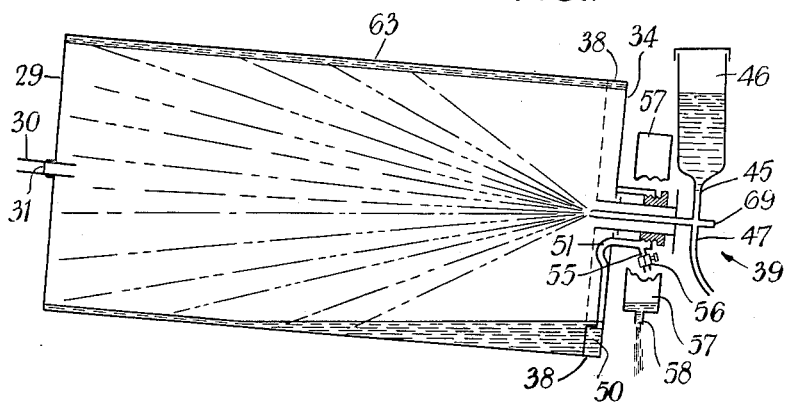
FIG.7
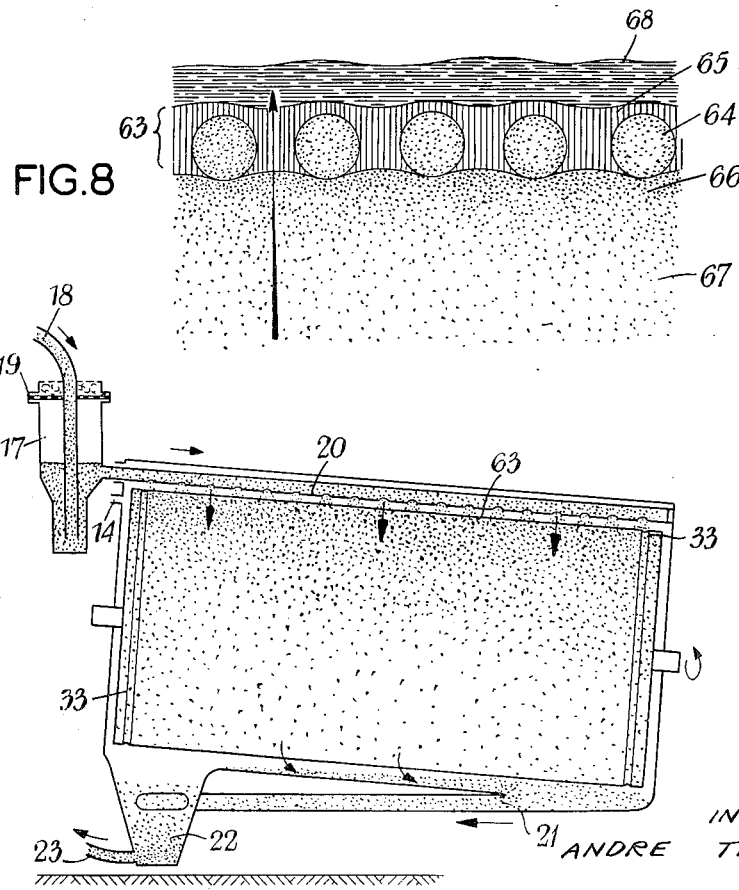
FIG.8
FIG.9
INVENTOR
ANDRE THOMAS
BY
ATTORNEY

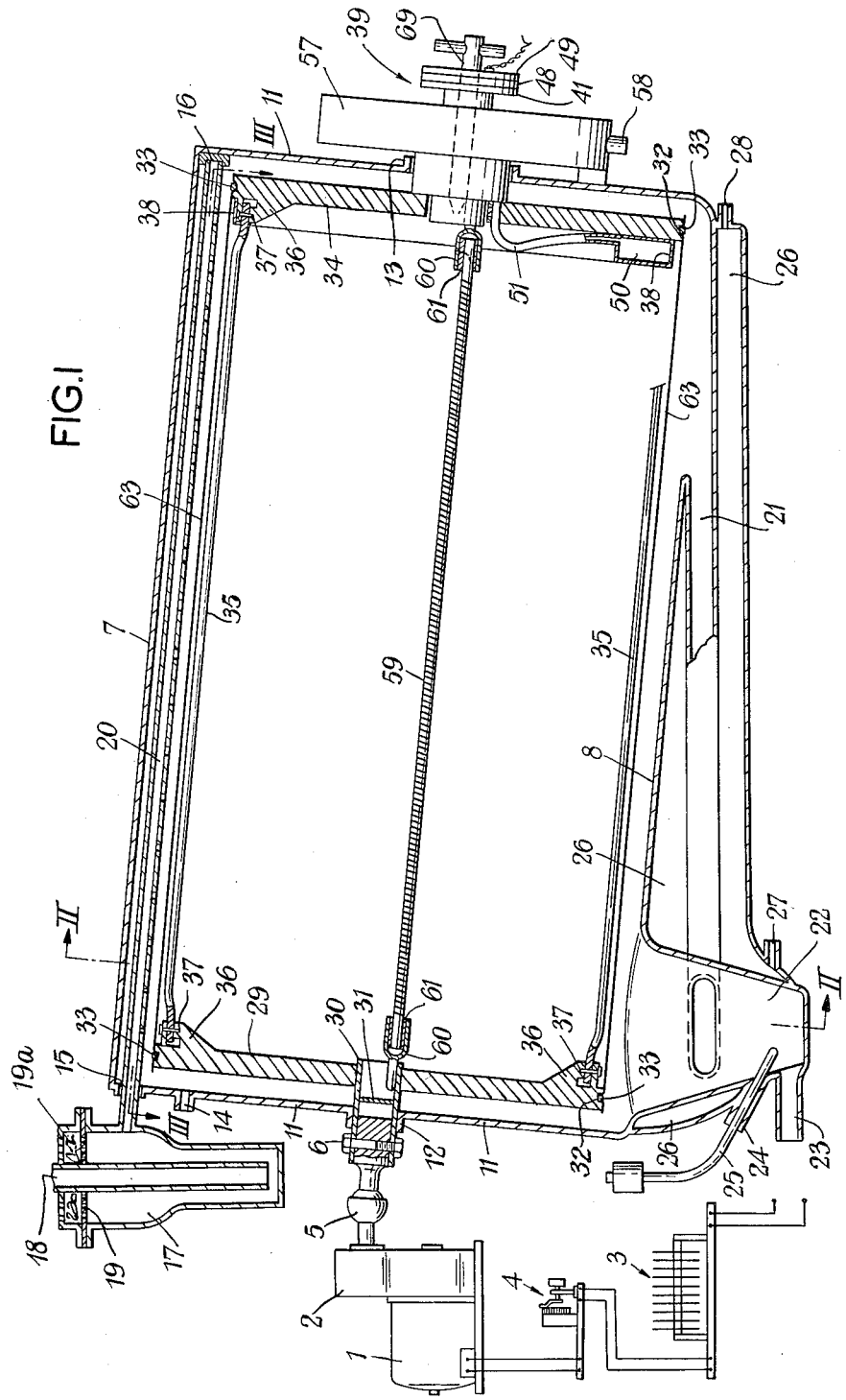

United States Patent Office 3,026,871
Patented Mar. 27, 1962

3,026,871
APPARATUS FOR OXYGENATING BLOOD
André Thomas, Paris, France, assignor to Societe de Constructions Mecaniques de Stains, Stains (Seine), France, a corporation of France
Filed Jan. 27, 1959, Ser. No. 789,364
Claims priority, application France Jan. 30, 1958
2 Claims. (Cl. 128—214)

This invention relates to an apparatus for the treatment of liquids through a membrane, and particularly to apparatus for the oxygenation or selective purification of blood.

It is required on various occasions to change, and sometimes to saturate, various liquids with a gas or a mixture of various gases. These gases may or may not react chemically with the liquid to be treated. The liquids to be treated may be intended for industrial manufacture, may be used in the preparation of various solutions etc., or may be biological liquids such as blood.

This gaseous saturation of liquids is difficult to effect in some cases, particularly when it is preferable to carry it out on thin layers for reasons connected with technical yield, speed and efficacity and above all when the liquid subjected to the gaseous charge is, by reason of its nature, likely to cause the formation of foam or troublesome froth.

For example, blood, which is a highly proteic liquid, gives off an extremely abundant foam if oxygen is directly bubbled therethrough. In order to make the blood suitable for use, this foam must be destroyed by some means, such as pneumatic defoaming, anti-foam silicone coating, etc., but in general this causes the blood globules to be damaged to a greater or lesser extent.

Various adaptations of the process of bubbling oxygen, or gas mixtures mainly containing oxygen, through blood have been applied in an attempt to moderate this process and to render it more effective on the blood. However, these adaptations do not permit of simply oxygenating relatively large quantities of blood at sufficient speed with a degree of oxygen saturation approaching maximum, for example at least five or more liters per minute.

In the case of the example of the oxygenation of blood, the bubbles of oxygen or of mixture rich in oxygen are directly introduced into the blood, depending upon the working conditions, through calibrated or non-calibrated orifices, or through a porous or micro-porous wall. In any case, however, blood foam is formed, or the blood brought into direct contact with a current of oxygen is spread out in a thin layer over a maximum movable or immovable surface, such for example as plates, troughs, tubes, cylinders, cones, discs or grids, or the blood is oxygenated by the gaseous oxygen through a normally semi-permeable membrane. In this type of method, the gaseous oxygen passes through the semi-permeable membrane into the blood, but such devices require a large exchange surface, while the yields of oxygenated blood obtained are relatively low.

On the other hand, when it is desired selectively and continuously to extract certain crystalloid substances entering into the composition of complex liquids, generally of proteic form, the method of dialysis through a normally semi-permeable membrane is employed. For example, blood can be extracted from electrolytes, such as urea, by simply disposing between the blood and a mass of water a normally semi-permeable membrane which acts as a normal dialyser which may take various forms and which may be movable or immovable. Generally speaking, such devices are of complex and cumbersome form and are difficult to asceptize when necessary, the semi-permeable membrane being fragile and affording a relatively low output.

The invention has for its object to provide an apparatus for the treatment of liquids through a membrane, more especially comprising an enclosed space having a microporous wall, members for the projection of gas under pressure into the enclosed space, an orifice for the introduction of an aqueous liquid into the enclosed space, members for feeding the liquid to be treated to the external wall of the enclosed space, a device for discharging the aqueous liquid from the enclosed space, and a device for discharging the gas situated in the enclosed space, the latter discharge device regulating the pressure in the said enclosed space.

The apparatus according to the invention differs in its principle and its construction from those heretofore described, and is more effective while not being attended by the aforesaid disadvantages. Depending upon the mode of use, the same apparatus permits either of enriching a liquid with a gas up to saturation point, with a high yield, and without foaming, or of selectively purifying a complex liquid from which it is desired to extract crystalloid substances, without difficulty and at a high rate.

The invention will now be described in detail with reference to a particular embodiment taken by way of example and illustrated in the accompanying drawings.

This embodiment is designed specially for the oxygenation or selective purification of blood for biological and medical uses. In the following description, the liquid to be treated will be referred to as blood and the gas used will be referred to as oxygen, but it will be understood that the apparatus described as one embodiment of the invention may be used with liquids other than blood and with gases other than oxygen, depending upon the applications envisaged, without departing from the scope of the invention.

FIG. 1 is a diagrammatic view of an apparatus embodying the invention, most of the parts of which are illustrated in longitudinal section;

FIG. 2 is a diagrammatic transverse section through the apparatus along the line II—II of FIG. 1;

FIG. 3 is a diagrammatic view along the line III—III of FIG. 1 showing the means for feeding and distributing the liquid to be treated in the apparatus;

FIG. 4 is a diagrammatic view on a larger scale of a part of FIG. 1, showing additional details and more especially a stuffing box and associated members illustrated in longitudinal section;

FIG. 5 is a diagrammatic front view of one of the cheeks of the rotor as seen from its inner face;

FIG. 6 is a diagrammatic view in perspective of a bucket supporting on its periphery the inner face of the cheek illustrated in FIG. 5;

FIG. 7 is a simplified diagrammatic longitudinal sectional view of the rotor, some of the details of which have been omitted for the sake of clarity, showing the rotor supporting a membrane into the enclosed space of which is blown an atomized liquid in the form of an aerosol;

FIG. 8 is a diagrammatic sectional view of the artificial membrane bounding the enclosed space; and FIG. 9 is a diagram illustrating the path of flow of liquid being treated in the apparatus.

The apparatus for the physiological oxygenation or purification of blood according to the invention comprises essentially two parts, the first of which consists of an electromechanical driving unit comprising driving members and control and regulating members. The second part consists of a sterilizable detachable functional unit composed principally of a casing or stator, a rotor supporting a membrane and various associated members.

The driving unit, which is intended for driving the rotor, preferably at a constant and adjustable speed, comprises an electric motor with reductions and change-speed gearings. The said change-speed gearing may be of one of the various known types, but a simple construction which permits of relatively extensive speed variations from several revolutions per minute to more than 100 revolutions per minute, while maintaining the torque of the motor, even at very low speed, consists according to FIGURE 1 of a direct-current motor 1 with a speed reduction gear 2, the mains alternating current being converted into direct current by a rectifier 3, while the variations of the speed of rotation of the motor are produced by means of a rheostat 4. The motor through the reduction gearing 2 drives the shaft of the rotor of the functional unit through a pin provided with a ball joint 5 and a screw bolt 6 or any other appropriate device.

The functional unit is made of plastic material, which is preferably transparent and chemically inert. In accordance with FIGS. 1, 2 and 9 it comprises a detachable two-part casing or stator enclosing or supporting a rotor lined by a membrane. The casing is in the form of a cylinder closed at its two ends by lateral walls. The axis of the said cylinder is preferably slightly inclined in relation to the horizontal, the higher end being on the side at which the blood is admitted in order to permit the flow of this liquid by gravity. The said casing is composed of two main parts. The upper part or cover 7 may comprise a flat portion in its upper region, while for the sake of convenience (FIG. 2) the lower part 8 is a trough of regular semi-cylindrical form. The cover 7 bears on the trough 8 in a plane extending through the axis of the cylinder, the parts 7 and 8 each being bounded by outwardly extending flanges 9. Disposed between the flat portions 9 is a packing 10 of flexible plastic material. The lateral walls 11 of the parts 7 and 8 each comprise a symmetrical axial recess of half-moon shape which, when the said parts are assembled, constitutes respectively a cradle 12 for the driving shaft of the rotor and a cradle 13 for the stuffing box performing the function of a second shaft of the rotor. The two parts 7 and 8 can be readily assembled and separated.

The part 7 (FIG. 1) comprises a flanged air intake 14, another flanged orifice 15 and an inner annular support 16 permitting of positioning or withdrawing the detachable blood admission device. The said device consists of a constant level reservoir 17 comprising an inlet pipe 18 extended to a point close to the bottom of the said reservoir and adjacent a detachable air filter 19 containing clouded cotton 19a, the cover and the base of which are both perforated to allow the passage of the air, the said reservoir itself being extended by an outlet pipe or distributor 20, which extends into the part 7 through the orifice 15 and bears on the annular support 16 at its closed end. The pipe 20 is slightly inclined with respect to the horizontal from the orifice 15 to the support 16, which is at a lower level than the orifice 15, so as to permit the flow of blood by gravity. The pipe 20 is formed with holes of increasing diameter in accordance with FIG. 3, the smallest holes close to the orifice 15 having, for example, a diameter of 1 mm. and the largest holes closest to the support 16 having, for example, a diameter of 3 mm. The said holes permit the regular descent of the blood which is to be subjected to oxygenation or purification on to the membrane 63 of the rotor, which will hereinafter be described.

The lower part 8 of the casing comprises a lower collecting channel 21, which starts from a splayed orifice in the lowermost part of the member 8, in which there collects the blood which has been spread on the membrane 63 of the rotor and has then flowed into the trough formed by the part 8 along the line of greatest slope. The said channel 21 is slightly inclined with respect to the horizontal in the opposite direction to the general inclination of the casing formed by the parts 7 and 8, so that it allows the blood to flow naturally by gravity into a reservoir 22. The said reservoir, which has the form, for example, of an inverted truncated cone is fixed to the part 8, into which it opens with a wider aperture at its larger base (FIGS. 1, 2 and 9) and it can be oriented in relation to the part 8 in accordance with FIG. 2. The inlet end of the channel 21 opens tangentially to the reservoir 22, below the level of the aperture of the said reservoir, into the part 8 in accordance with FIG. 2. Naturally, the reservoir 22 may also be a separate part from the member 8 and may be connected thereto by a detachable pipe. Almost all the blood which has just been oxygenated or purified on the membrane of the rotor therefore flows through the channel 21 and collects in the reservoir 22, from which it can be discharged through a duct 23, only a small part of the blood being able to pass directly into the reservoir 22 through the upper aperture therein. Dipping into the blood in the reservoir 22 by way of a nipple 24 is a temperature regulator 25.

The entire lower face of the part 8 is lined by a wall which bounds a chamber 26 (FIGS. 1 and 2) surrounding the channel 21 and partly surrounding the reservoir 22, the said wall comprising a nipple 27 and a nipple 28. The said chamber 26 with its two nipples 27, 28 is a water circulation chamber. The water can enter by way of the nipple 27 and leave by way of the nipple 28. Depending upon whether this circulating water is hot or cold the blood flowing from the bottom of the part 8 and into the channel 21 and the reservoir 22 can be heated or cooled.

The rotor supporting the membrane 63, which will hereinafter be described, can be entirely dismantled. It comprises (FIG. 1) two circular end plates and rods joining these two end plates. The end plate 29 on the blood admission side comprises a hollow shaft 30 provided with an internal transverse fluid-tight partition 31. The said shaft, which is driven by the ball-jointed shaft of the motor 5 and the pin 6, rotates the rotor about its own axis. Finally, the said end plate 29 is provided with an annular groove 32 permitting of readily fixing the membrane 63 by means of a clamping collar 33 (FIGS. 1 and 9).

The end plate 34 (FIG. 1) on the side opposite to the end plate 29 is also provided with an annular groove 32 for fixing the other end of the membrane 63 by means of a clamping collar 33 (FIGS. 1 and 9), and in addition to other members which will hereinafter be described, a double-walled stuffing box and a system for automatically collecting and ejecting the aqueous solution resulting from the condensation of an aerosol which is injected under pressure into the space enclosed by the membrane is provided.

The rods 35 (FIGS. 1, 2 and 5), of which there are eight, for example, and which connect the two end plates 29 and 34 and support the diaphragm 63, are cylindrical and have their ends slightly arched so as to be able to penetrate into passages formed in bracket-like lugs 36 welded face to face on the inner walls of each of the two end plates, in which passages the ends of the rods are fixed by detachable pins 37.

The end plate 34 is also provided on its inner side adjacent the periphery thereof with a collar or drum 38 (FIGS. 1, 5 and 6) which serves to collect the liquid emanating from the condensation of the aerosol injected into the rotor as will hereinafter be explained.

The stuffing box 39 comprises (FIGS. 1, 4 and 7) a fixed central portion consisting of the duct 40, the outer end of which supports a guard 41, and a portion rotating with the end plate 34, to which it is secured, consisting of a double-walled duct 42, a thrust ring 43 for the stuffing box 44a, an annular stuffing box nut 44, through the bore of which there extends the duct 40 on which the said nut is fitted, and which it permits to rotate, the said nut being screwed at its outer wall to the inner wall of the duct 42.

The duct 40 receives through its bore and approximately along its axis a metal liquid-atomizing nozzle 69 of the type employed in paint sprayers, which has an upwordly extending nipple 45 for the admission of liquid, which nipple is connected by a pipe to a liquid reservoir 46 (FIGS. 4 and 7), as also a downwardly extending nipple 47 for the admission of gas, for example oxygen or a mixture rich in oxygen, and a guard 48 fitted to the guard 41 to which it is fixed, for example, by screws, a plastic packing 49 being disposed between the guards 41 and 48 to ensure fluid tightness. An aerosol formed of liquid and oxygen is injected, as shown in FIG. 7, under pressure through the said nozzle into the space defined by the membrane fixed on the rotor. The said aerosol condenses on the inner face of the membrane, which it lines with a liquid coating, the liquid thus condensed collecting in the sloping parts of the rotor and finally in the drum 38 of the cheek 34.

The duct 42, which is formed integrally with the outer face of the cheek 34 and performs the function of a terminal shaft of the rotor, turning in the cradle 13 of the casing, comprises a double wall which serves for automatically discharging the liquid emanating from the condensation of the aerosol injected into the rotor. The inner face of the end plate 34 is provided on the inner face thereof adjacent the periphery thereof with a bucket 50 from which the liquid collected by the collar or drum 38 is discharged into a pipe 51 curved as illustrated in FIG. 7, the said pipe leading to an orifice 52 which in turn communicates with the cavity 53 of the double wall of the duct 42 of the stuffing box (FIG. 4). The said cavity 53 communicates at its outer end through an orifice 54 with an outlet branch 55. There may extend within the said outlet branch a flexible pipe provided with a screw clamping member 56, so as to form an adjustable outlet permitting of maintaining a predetermined pressure in the enclosed space. The liquid of condensation emanating from the aerosol injected into the rotor and collecting in the drum 38 fills the bucket each time the latter, which turns with the cheek 34, travels past the lowermost point. When the bucket rises towards the uppermost point, the liquid which it contains flows through the pipe 51 and tends to be expelled by the pressure existing in the enclosed space of the rotor. However, as a result of the curvature of the said rotating pipe, the liquid which has entered it is never expelled therefrom all at once. The expelled liquid passes through the orifice 52 into the cavity 53 and then through the orifice 54 into the outlet branch 55, which can be conveniently adjusted by means of the clip 56 in accordance with the pressure existing in the rotor and the speed of rotation of the latter. Thus, during a part of the rotation of the end plate 34, a jet of liquid escapes through the outlet branch 55, and during the remainder of the rotation of the end plate 34, a mixture of gas and liquid escapes. However, since the outlet 55 turns with the double wall 42 of the stuffing box, a detachable circular outer collecting trough 57 which may be attached to the rear wall of the part 8 of the casing and which is provided with a discharge pipe 58, permits of collecting by gravity the liquid automatically ejected by the discharge system of the rotor.

The liquid to be saturated with gas, such as the blood to be oxygenated may be heated by various methods, which may be employed separately or in combination. For example, there may be provided in association with the hot water circulation heating system in the chamber 26 a system for heating the aerosol injected into the space defined by the diaphragm mounted on the rotor, or a system for heating the gas employed to form the aerosol. In the case of the heating of the aerosol entering the space bounded by the membrane fixed on the rotor, the adjustable heating may be effected by means of a quartz infra-red tube 59 (FIGS. 1 and 4) containing a sufficient electric resistor, for example of 500 watts, the two wires of which extend through the same end of the quartz tube, the other end being closed. The said tube is disposed substantially along the axis of the rotor and is retained at each end by a glass shoulder 60, which is in turn protected against heating by a tube of flexible insulating material 61, which surrounds each end of the quartz tube. The tapered terminal portion of each shoulder forming an extension of the quartz tube is engaged at one end in the passage of the hollow shaft 30 of the rotor, which passage is closed by the partition 31, and at the other end in the duct 40 below the end of the nozzle 69. The two wires of the electric resistor of the quartz tube, which are insulated and covered by a fluid-tight plastic tube extending through the duct 40, extend through the guard 48 and project to the outside for connection by a small metal nipple 62 integral with the guard 48. The infra-red tube heats the aerosol and by way of the aerosol the diaphragm which, in turn, heats the blood by which it is covered. The temperature of the blood is automatically adjusted by the temperature regulator 25, of normal type, which dips into the blood in the reservoir 22 and opens or closes the circuit controlling the resistance of the quartz tube.

The diaphragm 63, which is maintained by the rods and the end plates of the rotor and which is gripped in fluid-tight fashion on the grooves 32 by clamping collars 33 (FIGS. 1 and 9), consists essentially of a strong, narrow-meshed, multi-filament fabric formed of natural or artificial textile materials, for example a polyamide fabric, the mesh of which has been tightened by calendering on both faces. The threads 64 (FIG. 8) forming the said membrane are coated either in a bath or by application by means of a brush or a spray gun, or by any other method, with a silicone film 65, which adheres well to the chosen fabric and does not hydrate. The silicone coating is sufficiently diluted with ether for use. The membrane thus formed and supported by the rotor is inflated by the pressure of oxygen blown into the enclosed space which it defines, its outer surface being smooth and not wettable by water. However, the said membrane is still more or less coarsely micro-porous. If the oxygen passes through it in the form of gas under pressure, it expands in the blood by which it is covered and may produce the formation of a blood foam. On the other hand, if the oxygen is dissolved in the liquid layer 66 lining the inner face of the membrane and emanating from the condensation of the aerosol 67 formed by the oxygen and by an aqueous liquid, water or a saline solution, the oxygen dissolved in the liquid layer 66 travels in the direction of the arrow (FIG. 8) through the membrane 63, which yields it to the blood 68 by which it is covered. The blood is at atmospheric pressure by reason of the air intake 14 of the casing and immediately becomes saturated with oxygen, its color changing from blackish-red to vivid red, the degree of saturation with oxygen reaching 99% or 100% without any formation of foam, as in the passage through the membrane of the lung of a living creature. The artificial membrane 63 thus prepared does not allow the liquid 66 to pass through directly, and also prevents the passage of blood therethrough. The rate of flow of the liquid circulating in the rotor and ejected through the outlet 55 is adjusted in relation to the speed of rotation of the rotor and the pressure inside the membrane; by suitable adjustment the rotational speed can be increased thus increasing the effective active surface of the membrane, and bringing, for example, its functional surface to 50 square meters per minute or more, and of saturating five liters of venous blood per minute without damaging the blood globules.

The blood therefore has a general circuit, which is the following as indicated by the arrows in FIG. 9: it enters the apparatus through the pipe 18 of the constant-level reservoir 17, flows by gravity through the inclined pipe 20, passes through the holes therein and falls on to the membrane 63 fixed by its two clamping collars 33 and turning at a preferably constant speed regulated by the rheostat 4. On the surface of the membrane, the blood at atmospheric pressure is immediately saturated with oxygen and heated exactly to the desired temperature, for example to 37° C. The blood thus oxygenated and heated flows almost entirely into the trough formed by the part 8 of the casing, along the line of greatest slope, and then flows through the collecting passage 21 into the reservoir 22 and reaches, for example, a predetermined level which can be maintained exactly constant by adjustment of the apparatus. By reason of the passage of the blood through the channel 21, the circuit can be readily adjusted so as to ensure a constant level in the reservoir 22, so that the blood does not collect in the large space formed by the trough of the member 8, which could not be readily ensured if the channel 21 were not provided. In addition, the blood flows through the channel 21 without turbulence and without the formation of air bubbles. The relatively small quantity of blood directly entering the reservoir 22 through its large upper aperture does not substantially change the conditions of the principle. The oxygenated and heated blood which collects in the reservoir 22 thereafter leaves through the duct 23 for the purpose of use.

The whole assembly of plastic material thus described may be sterilized, for example, by antiseptic agents, or by a current of ozonized oxygen, which is passed through the various parts of the apparatus for an adequate period, of the order of from one to several hours, or by any other means. The apparatus comprising bacteriological protection means consisting of the air filter 19 containing cotton 19a and of appropriate wads of carded cotton disposed in the air intake 14, and in the free parts of the inlet orifice 15 of the inclined pipe and of the cradles 12 and 13, remains sterile and the oxygenation of the heating and the purification of blood are performed in an aseptic manner.

The same apparatus may be employed for the selected purification of blood, for example in cases where the blood contains an excess of urea or other substances which it is necessary to extract to a large extent from the circulation. This constitutes a second general type of utilization of the same apparatus.

In this case, the speed of rotation of the membrane may be sufficiently reduced to permit prolonged contact between the membrane and the blood. The apparatus is so employed that the blood collects sufficiently in the trough of the part 8 of the casing, for example, by closing the inlet orifice of the channel 21, so that the membrane dips over its entire surface, while rotating, in the blood accumulated in the said trough. Finally, the aerosol injected into the rotor consists of distilled water and oxygen or simply distilled water and compressed air. The blood is heated, for example by circulation of hot water in the circulation chamber 26, if this is necessary, or by the infra-red tube 59, or it may be cooled by circulation of cold water through the circulation chamber 26. Under such conditions, the manner of operation of the membrane is different from that described for the oxygenation of blood, and an excess of crystalloid substances, such as urea for example, may be extracted thereby from the blood spread over its outer surface. These substances collect in the distilled water, which forms a liquid sheet on the inner face of the membrane, which liquid sheet emanates from the condensation of the aerosol of water and air. The water ejected through the outlet 55 then contains crystalloid substances selectively extracted from the blood, notably urea, while the large molecules of the blood do not pass through the membrane. A continuous selective purification of the blood can thus be effectively performed under simple conditions and at a high rate.

The preparation of the membrane, the assembly, the sterilization, the utilization, the dismantling and the cleaning of the whole of the apparatus according to the invention are simple. The apparatus has small overall dimensions and is readily transportable. The blood is well oxygenated, heated or cooled, according to requirement, and always remains at atmospheric pressure.

Naturally, embodiments of the principle of the invention other than described by way of example may be carried out without departing from the scope of this invention. For example, membranes formed by supports of various materials, and covered with coatings of various natures may be employed. It is also possible to use as diaphragms thin sheets of natural or synthetic origin, such as sheets of polyamides, polyethylene, polystyrene, ethyl cellulose or of any other material, whether these sheets are employed with a support of textile or of other nature, or are disposed between two supports, one on the inner face and the other on the outer face of the sheet, or without any support.

It is also possible to introduce into the space enclosed by the membrane, by way of separate orifices, on the one hand the aqueous solution and on the other hand the gas under pressure.

The liquid to be treated may be distributed inside the diaphragm instead of outside it, the enclosed space under gas pressure then being defined by the outer face of the membrane and the wall of a fluid-tight casing. Generally speaking, the enclosed space under pressure may consist of a cavity defined at least partially by a movable or immovable membrane, regardless of the form and arrangement of the said membrane.

What I claim is:

1. Apparatus for oxygenating blood comprising a closed housing, a cylinder mounted to rotate in said housing about a substantially horizontal axis, said cylinder having a peripheral wall comprising a fabric carrying a silicone film and having closed end walls, means supplying an oxygen containing fluid to the interior of the cylinder, means feeding blood onto the outer surface of said peripheral wall to be oxygenated by oxygen from the interior of said cylinder which diffuses through said wall, means collecting the oxygenated blood in said housing, means including a nozzle positioned to spray an aerosol of a treating liquid onto the inner surface of said peripheral wall, and means discharging the treating liquid from said cylinder, comprising a passage through one of said end walls containing a liquid seal and a bucket carried by said last end wall and rotating therewith positioned to dip into the liquid contained in said cylinder and to discharge the same into said passage as the bucket is raised by the rotation of said cylinder.

2. Apparatus according to claim 1 in which the means for feeding blood to the outer surface of said peripheral wall comprises at least one tube receiving the blood, said tube having orifices which increase in size along the length of the tube, the smallest orifices being those nearest the inlet end of the tube and the largest orifices being nearest the other, closed, end of the tube.

References Cited in the file of this patent

UNITED STATES PATENTS

| 2,404,872 | Walker | July 30, 1946 |
| 2,559,164 | McAllister | July 3, 1951 |
| 2,593,540 | Cornwell, et al. | Apr. 22, 1952 |
| 2,721,732 | Melrose | Oct. 25, 1955 |

FOREIGN PATENTS

| 461,160 | Italy | Jan. 15, 1951 |

OTHER REFERENCES

Kolff et al.: "Disposable Membrane Oxygenator and Its Use in Experimental Surgery," from the Cleveland Clinic Quarterly, vol. 23, April 1956, No. 2. (Copy available in National Library of Medicine.)

Karlson et al.: "Pump Oxygenator to Supplant the Heart and Lungs for Brief Periods," from Surgery, vol. 29, No. 5, May 1951, pages 678–696 (pages 685–687 relied on).

Crafoord et al.: "Clinical Studies in Extracorporeal Circulation With a Heart-Lung Machine," from Aita Chirurgica Scandinavica, 1956, vol. 112, No. 34, pages 220–225.